United States Patent
Feng et al.

(10) Patent No.: US 9,424,732 B2
(45) Date of Patent: Aug. 23, 2016

(54) DETACHED ACCESSORY NOTIFICATION

(71) Applicant: Lenovo (Singapore) Pte. Ltd., Singapore (SG)

(72) Inventors: Xin Feng, Morrisville, NC (US); Ethan Joshua Fricklas, Hillsborough, NC (US); Christopher Miles Osborne, Cary, NC (US); Kazuo Nakada, Kanagawa-ken (JP); Shinnosuke Takahashi, Kanagawa-ken (JP); David Wayne Hill, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/533,525

(22) Filed: Nov. 5, 2014

(65) Prior Publication Data
US 2016/0125718 A1 May 5, 2016

(51) Int. Cl.
*G08B 21/00* (2006.01)
*G08B 21/18* (2006.01)
*G06F 1/00* (2006.01)

(52) U.S. Cl.
CPC . *G08B 21/18* (2013.01); *G06F 1/00* (2013.01); *G06F 2101/00* (2013.01)

(58) Field of Classification Search
CPC .............................. G06F 1/00; G06F 2101/00
See application file for complete search history.

(56) References Cited

U.S. PATENT DOCUMENTS

| 6,265,974 B1 * | 7/2001 | D'Angelo | G08B 13/1409 340/328 |
| 2013/0120281 A1 * | 5/2013 | Harris | G06F 3/04883 345/173 |
| 2015/0140936 A1 * | 5/2015 | Sachs | H04W 4/22 455/67.11 |

* cited by examiner

*Primary Examiner* — Shirley Lu
(74) *Attorney, Agent, or Firm* — Ference & Associates LLC

(57) ABSTRACT

One embodiment provides a method comprising: associating, using a processor, an accessory with an information handling device; detecting, using a processor, a trigger event associated with the information handling device; determining, using a processor, the accessory is no longer within a predetermined proximity to the information handling device; and providing, using a processor, a notification to a user. Other aspects are described and claimed.

16 Claims, 3 Drawing Sheets

DETACHED ACCESSORY NOTIFICATION

BACKGROUND

The portability of information handling devices (e.g., smart phone, tablet, laptop computer, e-reader, etc.) allow users to carry their information handling devices ("devices") and use them in a variety of locations. A variety of accessories exist for these information handling devices. For example, some accessories may assist a user in creating a more user friendly experience (e.g., mouse, keyboard, stylus, headset, etc.). Some accessories, on the other hand, may be used to power and/or connect the device (e.g., power brick, power cable, sync cable, etc.). While some of the accessories are connected to the information handling device using a wired or a wireless connection (e.g., mouse, keyboard, headset, etc.), some of the accessories have a dedicated storage location included on the information handling device (e.g., stylus, dock, etc.). The commonality of all these different accessories is that they can be detached from the information handling device in some way.

BRIEF SUMMARY

In summary, one aspect provides a method comprising: associating, using a processor, an accessory with an information handling device; detecting, using a processor, a trigger event associated with the information handling device; determining, using a processor, the accessory is no longer within a predetermined proximity to the information handling device; and providing, using a processor, a notification to a user.

Another aspect provides an information handling device, comprising: a processor; a memory device that stores instructions executable by the processor to: associate an accessory with an information handling device; detect a trigger event associated with the information handling device; determine the accessory is no longer within a predetermined proximity to the information handling device; and provide a notification to a user.

A further aspect provides a product, comprising: a storage device having code stored therewith, the code being executable by the processor and comprising: code that associates, using a processor, an accessory with an information handling device; code that detects, using a processor, a trigger event associated with the information handling device; code that determines, using a processor, the accessory is no longer within a predetermined proximity to the information handling device; and code that provides, using a processor, a notification to a user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
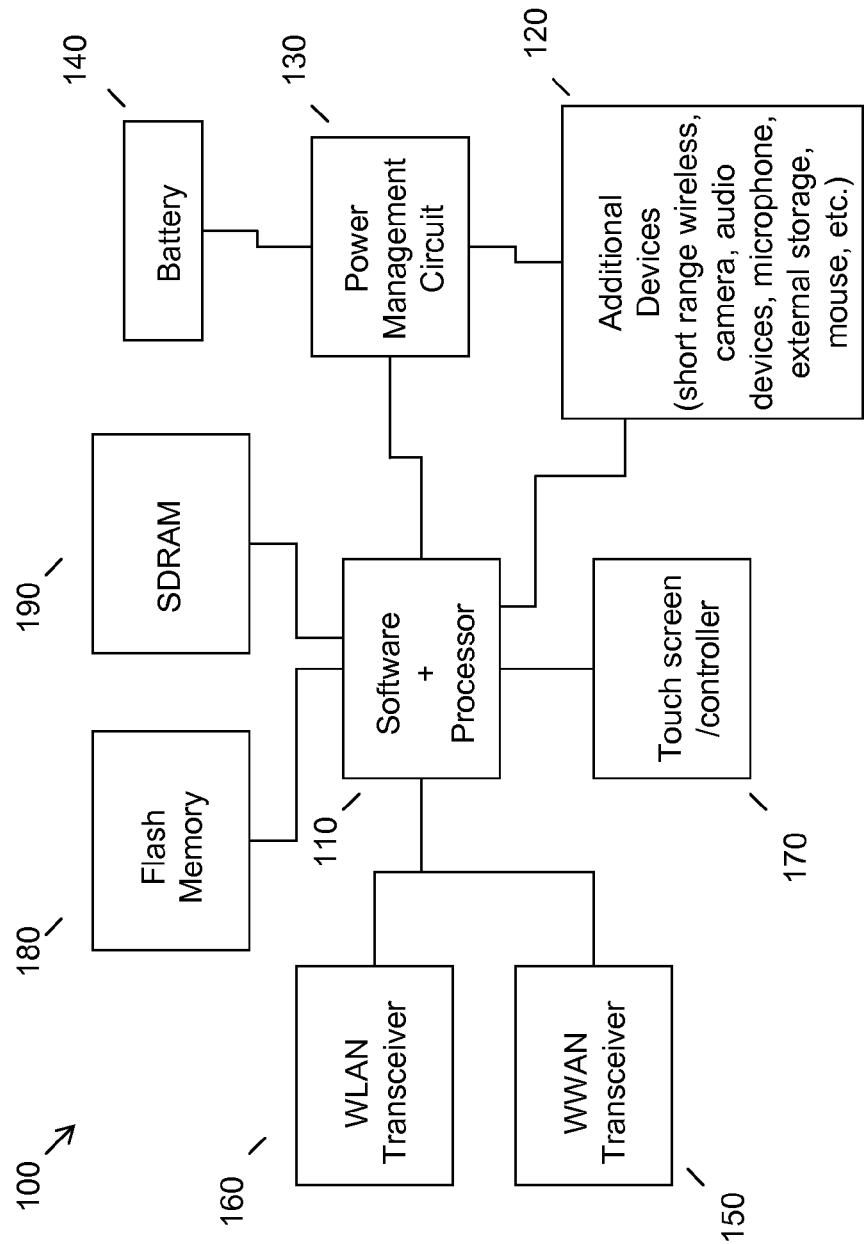
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

With the portability of information handling devices (e.g., smart phone, tablet, laptop computer, personal data assistant, portable gaming device, etc.) increasing and the increased ability to connect to a network in a variety of locations, people tend to take information handling devices with them more frequently. For example, employees may carry laptops and smart phones with them when traveling for business. As another example, people may take an e-reader with them to a coffee shop. These information handling devices ("devices") tend to either need accessories, for example, a power cord, power brick, sync cable, and the like, or are more user friendly with the assistance of accessories, for example, a stylus, dock, wireless mouse, headset, wired keyboard, and the like.

With the large number of accessories available for a single device, a user may have a hard time remembering to gather all the accessories before departing a location. For example, when a person is leaving a hotel they may forget to unplug the power cable from the wall and include it with their luggage. In addition, the user may not remember the accessory until the next time they attempt to use the accessory. Unfortunately, this may not be until the user has left the location where the accessory was last used.

Accordingly, an embodiment provides a method of notifying a user if an accessory is being left behind. One embodiment may associate an accessory with an information handling device. For example, an information handling device may know that an accessory belongs to the information handling device. An embodiment may then detect a trigger event associated with the information handling device. This trigger event may indicate to an embodiment that there is a possibility of an accessory being left behind. For example, an embodiment may determine that a user is moving the information handling device. As another example, an embodiment may determine that an amount of time has passed since the accessory was last with the information handling device.

An embodiment may then determine if the accessory is within a predetermined proximity to the device. This may indicate whether the accessory is being forgotten. For example, if the information handling device has an onboard storage location for an accessory, an embodiment may determine that the accessory is not currently located in that onboard storage location. Additionally or alternatively, an embodiment may determine that the distance between the device and the accessory is increasing, which may indicate that the information handling device is being taken away without the accessory. One embodiment may then provide a notification to the user indicated that the accessory is being left behind.

One embodiment may additionally obtain information relating to the accessory at the time an embodiment determines that the accessory is no longer within a predetermined proximity to the device. This information may include information relating to the location and time at which an embodiment determined that the accessory is outside the predetermined proximity. The information may be obtained from the information handling device or the accessory. For example, an embodiment may create a time stamp which indicates the network that the device was connected to at the time the accessory was left. As another example, an embodiment may access an application installed on the information handling device to determine a possible location of the accessory. For example, an embodiment may determine the last time that the accessory was within the predetermined proximity to the device. An embodiment may then use this information and compare that time with information gathered from the application. For example, an embodiment may determine that the accessory was last connected to the device at 10:00 a.m. According to the user's schedule, they were located at a particular location at 10:00 a.m. After obtaining the information relating to the accessory, an embodiment may then provide this information to the user.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices 120 may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., accessories such as a mouse, keyboard, camera, headset, etc. System 100 often includes a touch screen 170 for data input and display/rendering. System 100 also typically includes various memory devices, for example flash memory 180 and SDRAM 190.

Figure 2:
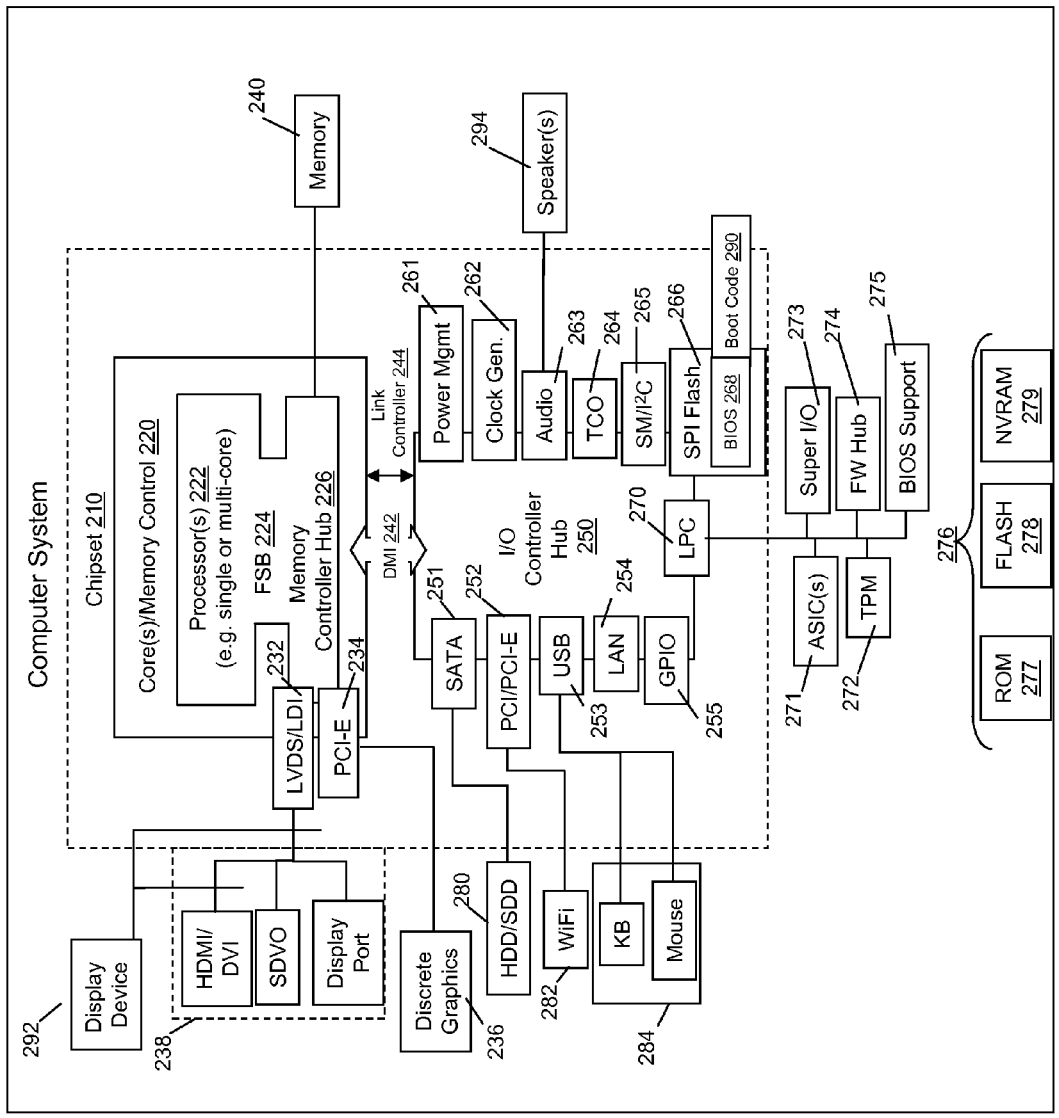
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which may include accessories that can be forgotten by a user. Such devices may also be used to notify the user that an accessory is being left behind. For example, the circuitry outlined in FIG. 1 may be implemented in a tablet or smart phone embodiment, whereas the circuitry outlined in FIG. 2 may be implemented in a personal computer embodiment. Additionally or alternatively, circuitry such as outlined in FIG. 1 or FIG. 2, may be included in an accessory to connect to or communicate with another information handling device.

Figure 3:
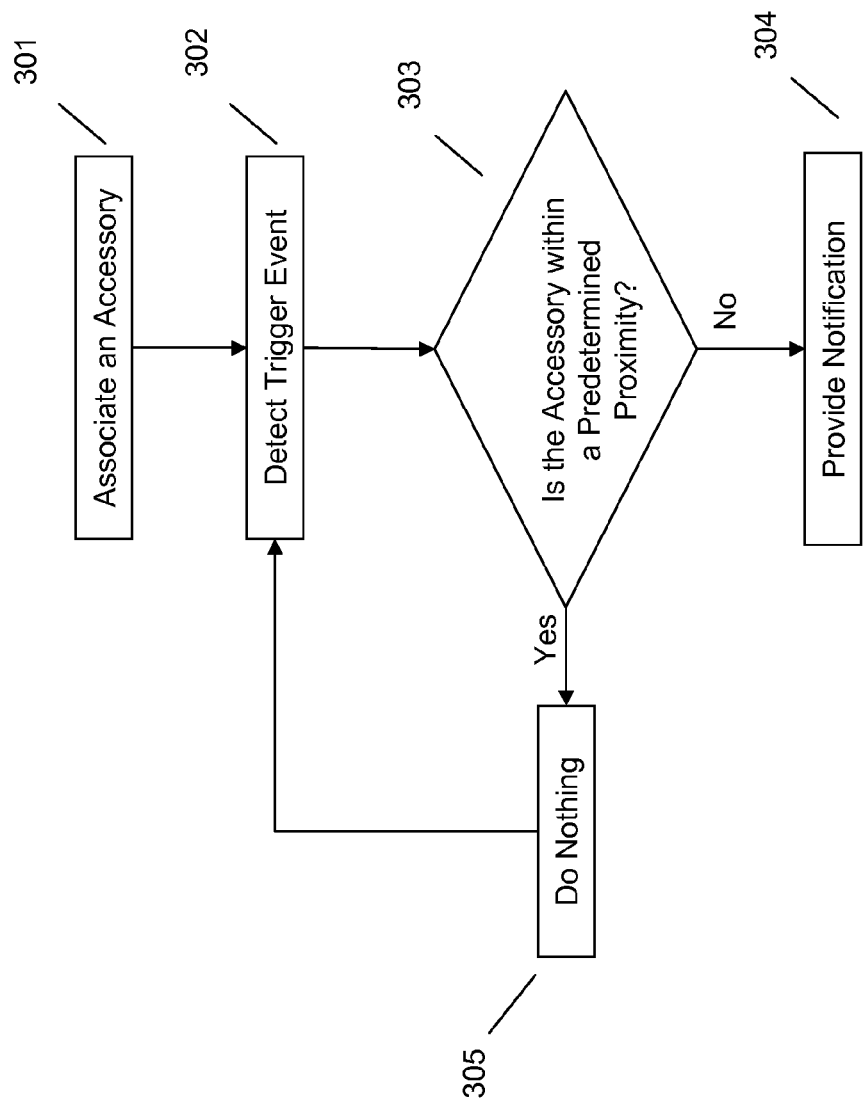
FIG. 3 illustrates an example method of detached accessory notification.

Referring now to FIG. 3, at 301 an embodiment may associate an accessory with an information handling device. This association may allow an embodiment to determine whether an accessory is included with or used as a part of an information handling device. The association may occur at different times depending on the type of accessory or the type of connection the accessory has to the device. For example, an embodiment may associate an accessory with the information handling device once the accessory is plugged into the device, such as in the case of a micro USB connector associated with a wireless mouse. In the case of an accessory connected to the device through a wireless connection, an embodiment may make the association when the accessory is turned on and communicating with the device, such as in the case of a headset. As another example, in the case of an accessory that is normally attached to the device, the association may occur when the accessory is removed from the device, such as in the case of a stylus. The association may also occur after the accessory is plugged into the device and then removed, such as in the case of a power cord or memory card.

An embodiment may associate an accessory as being with the information handling device once the accessory is connected to the device. This connection may include a wired connection or may include a wireless connection. In a wireless communication a piece of the accessory may be plugged into the device (e.g., micro USB, USB, etc.) or the accessory may communicate with communication devices integral to the device (e.g., Bluetooth, wireless network, etc.). Once the accessory is connected to the device, an embodiment may recognize that the accessory should be with the device. For example, a wireless mouse may include a micro USB connector that plugs into the information handling device. The information handling device may then recognize the micro USB as belonging to a wireless mouse.

In one embodiment, the association may occur through the use of an accessory attachment port included on the information handling device. For example, an accessory such as a stylus, memory card, and the like, may have a dedicated storage space included on the device. An embodiment may recognize that an accessory should be located in the accessory attachment port, and associate the accessory with the device. Additionally or alternatively, an embodiment may associate an accessory with the information handling device through the use of a connection port included on the device. This connection port may or may not have an accessory connected at the time of the association. For example, an information handling device may have a power port so an embodiment would associate a power brick with the information handling device. An embodiment may recognize that an accessory is normally connected to the connection port and may associate the accessory with the device. An embodiment may alternatively or additionally, recognize when a device has been connected to the connection and then subsequently removed from the connection port. For example, when a user plugs a sync cable into a device, the device may detect the sync cable. When the user unplugs the sync cable, the device may detect the removal of the sync cable.

At 302, an embodiment may detect a trigger event associated with the information handling device. In accordance with one embodiment, this trigger event may include an embodiment detecting that the information handling device is moving. This detection may occur using a detection device, for example, accelerometer, gyroscope, image capture device, global positioning system, and the like. The information handling device changing power modes may be a trigger event in one embodiment. For example, an embodiment may detect that the device is entering a sleep mode. One embodiment may detect that the device is using a particular power source. For example, an embodiment may detect that the device is currently running off battery power, rather than being plugged in. In another example embodiment, the trigger event may include a predetermined amount of time passing. For example, an embodiment may detect that the device has been in use for an hour. In accordance with an embodiment, a combination of trigger events may be detected. For example, an embodiment may detect that the device is moving and has also entered a power off mode.

In one embodiment, the trigger mode may include detecting that the information handling device is in a particular location. This detection may be completed using sensors or hardware connected to or integral to the information handling device (e.g., GPS, Bluetooth connectivity, wireless network connectivity, etc.). For example, a device may detect that it is connected to an airport wireless network. Based upon the location, the device may determine whether a user would want to be notified of an accessory that is being left behind. For example, a user may not want to be notified if the device is located at the user's home. On the other hand, a user may want to be notified if they are at a public location, for example, a coffee shop. These trigger events are examples only and are not limiting.

At 303, an embodiment may determine whether the accessory is within a predetermined proximity to the information handling device. The predetermined proximity may be dependent on the type of accessory or the method in which the accessory is connected to the device. For example, if the accessory has dedicated storage or connection port on the device, the predetermined proximity may comprise the accessory being attached to the device (e.g., the accessory is within the dedicated storage location). Therefore, in one embodiment, the determining at 303 may include identifying the accessory is not attached to the device. For example, if the accessory is a stylus that has dedicated storage on the device, an embodiment may determine that the stylus is not in the storage location. As another example, if the accessory is a power brick that has a connection port on the device, an embodiment may determine that the power brick is not currently connected to the device.

In one embodiment, determining that the accessory is no longer attached to the device occurs through a sensor. This sensor may be located on or in the information handling device, on or in the accessory, or a combination of the two locations. For example, the storage location of the memory card may include a mechanical pin or electrical connection that detects whether the memory card is currently within the storage location. As another example, the stylus may include a magnet within the stylus. When the stylus is installed in its storage location, the device detects the magnet thereby indicating that the stylus is currently installed. A variety of sensors may be employed, for example, mechanical, electrical, software, electro-mechanical, and the like.

In one embodiment, if the accessory is not normally attached to the device (i.e., the accessory does not have a dedicated storage location on the device), but has been associated with the device, the determining at 303 may occur using a distance from the device rather than determining whether the accessory is attached to/detached from the device. For example, a headset may be wirelessly connected to or communicating with an information handling device, however, the headset does not have a dedicated storage space located on the device. Therefore, the determining at 303 may comprise identifying how far the accessory is from the device and determining whether that distance is increasing. For example, an embodiment may determine that a wireless mouse is currently three feet from the device and the distance is currently increasing at a rate of two feet per second.

As another example, if the accessory is associated using a connection port, an embodiment may determine at 303 using additionally captured information. For example, a user may insert a memory card into the device. When the memory card is inserted, the device may determine the wireless network to which the device is currently connected, for example, the airport. If a user subsequently removes the memory card, the device may identify that the card is no longer within a predetermined proximity to the device. In other words, an embodiment may determine at 303 that an accessory is no longer within a predetermined proximity because it is no longer connected to the device. Additionally, the device may determine based upon additional data (e.g., location data, network data, etc.) that the accessory may be left behind at a location the user does not desire to leave the accessory behind.

Additionally or alternatively, an embodiment may identify the distance that the accessory is from the device during normal use, and determine at 303 whether the accessory is within that distance. For example, an embodiment may determine that during normal use the headset is within fifteen feet of the device. An embodiment may then, at 303, determine that the distance between the headset and the device is greater than fifteen feet. This determination of distance may occur using a variety of devices, for example, proximity sensors, global positioning system, Bluetooth connections, and the like. These devices may be included in or on the information handling device, the accessory, or both. The predetermined proximity may be configured by the user. For example, the user may choose to not have any notifications unless an accessory is more than thirty yards away from the device.

If the accessory is within the predetermined proximity, an embodiment may do nothing at 305 and wait for the detection of another trigger event at 302. Alternatively or additionally, an embodiment may do nothing at 305 and associate a new accessory with the information handling device at 301. If, however, the accessory is no longer within the predetermined proximity, an embodiment may provide a notification to the user at 304. The notification may indicate that the accessory is no longer within a predetermined proximity to the information handling device. The notification provided to the user at 304 may be a visual notification (e.g., pop-up window on the device display, flashing lights on the accessory, etc.), an auditory notification (e.g., alarm, beeping, etc.), or a haptic notification (e.g., the device vibrates, the accessory vibrates, the device sends an electrical pulse, etc.). For example, an embodiment may associate a wireless mouse to an information handling device through the micro USB connector plugged into the device. An embodiment may then detect that the device is moving and the mouse is no longer within five feet of the device. The user may then be provided a pop-up message on the device indicating that the mouse is not with the device.

The notification may not be a specific notification indicating that an accessory is definitively being left behind. Rather the notification, in one embodiment, may indicate to the user that an accessory has a possibility of being left behind. For example, a device may have determined that an accessory was once plugged in, but is no longer plugged into the device. The notification provided may then indicate to the user to not forget the accessory. For example, if a user had a power cord plugged into their laptop. The laptop may associate the power cord with the laptop. A user then unplugs the power cord. Since the power cord does not contain any circuitry which allows the laptop to know whether the power cord is within a particular distance, the laptop may provide a notification indicating "do not forget the power cord", "have you remembered your power cord?", or something similar.

In one embodiment, the notification may be configured by the user. For example, the user may configure the notification to not occur unless the accessory has not been reattached to the device within an hour. One embodiment may allow the user to configure the type of notification or the number of notifications. For example, the user may configure an embodiment to provide an audible notification if a particular accessory is not attached to the device. Alternatively, the user may configure an embodiment to provide a pop-up display if a different accessory is not within a predetermined proximity to the device. An embodiment may additionally allow a user to configure a multitude of notifications. For example, a user may want a pop-up display, audible alarm, and flashing lights if an accessory outside the predetermined proximity.

The notification may also be configured by the user to only occur in particular locations. For example, a user may configure an embodiment to not give any notifications if the device is located within their home. In one embodiment a user may indicate notifications should not be provided for particular accessories in particular locations. For example, a user may configure an embodiment to not provide notifications if the power brick is not connected while the device is in the work location. An embodiment may use information obtained from the information handling device or other accessible information sources to determine the current location of the device. For example, an embodiment may determine the wireless network connection, GPS coordinates, user input indicating the location, and the like, to determine the current location.

In one embodiment, an embodiment may obtain information associated with the accessory. This obtaining of information may occur when different events occur, for example, when the trigger event is detected, when it is determined that the accessory is no longer within a predetermined proximity to the device, or when the notification is provided to the user, and the like. The data may include information regarding the location or possible location of the accessory. For example, the data may include information regarding the network connection that the device was connected to at the point in time when the data is obtained. As another example, the data may include GPS data received from the accessory. One embodiment may obtain the information by receiving data from the information handling device. Data may also be received from the accessory or other information sources (e.g., network connection, applications, etc.). In one embodiment the data may comprise data from a sensor located on the information handling device, the accessory, or both. For example, the information handling device and accessories may have proximity sensors indicating the accessory is within a specific distance of the device.

One embodiment may receive the data from scheduling data, for example, from an application installed on the information handling device. For example, an embodiment may determine that the accessory was last within the predetermined proximity of the device at 2:00 p.m. An embodiment may then access the calendar of a user and determine that the user was in a meeting in a particular room at 2:00 p.m. Once the information has been obtained, the information may then be provided to the user. The information may be provided in a notification to the user or the user may access an application which displays the information.

Accordingly, as illustrated by the example embodiments and figures, an embodiment provides a method of notifying a user that an accessory is or may be being left behind. An embodiment may associate an accessory with an information handling device. Upon receiving a trigger event with regard to the information handling device, an embodiment may determine whether the accessory is within a predetermined proximity to the information handling device. For example, one embodiment may determine whether the accessory has been reattached to the device. As another example, an embodiment may determine whether the accessory is within a specific distance to the device. One embodiment may additionally determine that the distance between the accessory and device is increasing. If an embodiment determines that the accessory is no longer with the predetermined proximity, an embodiment may provide a notification to the user. Additionally, an embodiment may obtain information associated with the accessory and indicate to a user, once the accessory has been left behind, a possible location of the accessory. Thus, in accordance with one embodiment, users of accessories associated with information handling devices may be reminded of accessories that have a possibility of being forgotten.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages.

The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   associating, using a processor, a stylus with an information handling device;
   detecting, using a processor, that the information handling device is moving;
   determining, using a processor, the stylus is not within an onboard storage location within the information handling device; and
   providing, using a processor, a notification to a user that the stylus is not within the onboard storage location.

2. The method of claim 1, wherein the determining the stylus is not within the onboard storage location comprises using a sensor located in a location selected from the group consisting of: on the information handling device and on the stylus.

3. The method of claim 1, further comprising:
   obtaining location information associated with the stylus no longer being within the onboard storage location; and
   communicating the location information to the user.

4. The method of claim 3, wherein the obtaining comprises receiving data from the information handling device, wherein the data includes information regarding a last known attached location of the stylus.

5. The method of claim 4, wherein the data is selected from the group consisting of sensor data and scheduling data.

6. The method of claim 3, wherein the obtaining location information occurs at a time associated with an event selected from the group consisting of: the detecting, the determining, and the providing.

7. The method of claim 1, wherein the detecting further comprises detecting an event selected from the group consisting of: detecting that the information handling device is changing power modes, detecting that the information handling device is using a particular power source, detecting that the information handling device is in a particular location, and detecting that a predetermined amount of time has passed.

8. The method of claim 1, wherein the informing comprises a notification selected from the group consisting of: a haptic notification, an audible notification, and a visual notification.

9. An information handling device, comprising:
a processor;
a memory device that stores instructions executable by the processor to:
associate a stylus with an information handling device;
detect that the information handling device is moving;
determine the stylus is not within an onboard storage location within the information handling device; and
provide a notification to a user that the stylus is not within the onboard storage location.

10. The information handling device of claim 9, wherein the determining the stylus is not within the onboard storage location comprises using a sensor located in a location selected from the group consisting of: on the information handling device and on the stylus.

11. The information handling device of claim 9, wherein the instructions are further executable by the processor to:
obtain location information associated with the stylus no longer being within the onboard storage location; and
communicate the location information to the user.

12. The information handling device of claim 11, wherein to obtain comprises receiving data from the information handling device, wherein the data includes information regarding a last known attached location of the stylus.

13. The information handling device of claim 12, wherein the data is selected from the group consisting of sensor data and scheduling data.

14. The information handling device of claim 11, wherein to obtain location information occurs at a time associated with an event selected from the group consisting of: to detect, to determine, and to provide.

15. The information handling device of claim 9, wherein the instructions executable by the processor to detect comprise instructions that detect an event selected from the group consisting of: information handling device is changing power modes, the information handling device is using a particular power source, the information handling device is in a particular location, and a predetermined amount of time has passed.

16. A product, comprising:
a storage device having code stored therewith, the code being executable by the processor and comprising:
code that associates, using a processor, a stylus with an information handling device;
code that detects, using a processor, that the information handling device is moving;
code that determines, using a processor, the stylus is not longer within an onboard storage location within the information handling device; and
code that provides, using a processor, a notification to a user that the stylus is not within the onboard storage location.

* * * * *